United States Patent [19]

Kuwahara et al.

[11] Patent Number: 5,204,606
[45] Date of Patent: Apr. 20, 1993

[54] INDUCTION MOTOR CONTROL APPARATUS

[75] Inventors: Naruto Kuwahara; Takefumi Hatanaka, both of Tokyo, Japan

[73] Assignee: Arex Electronics Corp., Tokyo, Japan

[21] Appl. No.: 776,117

[22] Filed: Oct. 15, 1991

[30] Foreign Application Priority Data

Dec. 12, 1990 [JP] Japan .................................. 2-409880

[51] Int. Cl.$^5$ .......................................... H02P 7/36
[52] U.S. Cl. .................... 318/800; 318/438; 318/812
[58] Field of Search ............. 318/800, 801, 802, 803, 318/805, 809, 438, 812; 363/97; 322/20, 29, 32; 324/158 R

[56] References Cited

U.S. PATENT DOCUMENTS

| | | | |
|---|---|---|---|
| 4,249,120 | 2/1981 | Earle | 318/805 |
| 4,280,038 | 7/1981 | Havas et al. | 363/97 |
| 4,806,841 | 2/1989 | Lee et al. | 322/29 |
| 5,003,252 | 3/1991 | Nystrom | 324/158 R |
| 5,010,287 | 4/1991 | Mukai et al. | 318/801 |

Primary Examiner—William M. Shoop, Jr.
Assistant Examiner—John W. Cabeca
Attorney, Agent, or Firm—Frank J. Jordan

[57] ABSTRACT

An induction motor control apparatus for controlling the power factor at which an induction motor operates includes sensors and circuits for periodically detecting the effective (RMS) values of current and voltage supplied to the motor winding during a fixed number of cycles, e.g. one cycle, and multiplying these to obtain a value of apparent power of the motor, together with circuits for detecting the working power of the motor, with the power factor of the motor being thereby accurately obtained. The detected power factor is compared with an ideal value of power factor, to obtain an error amount that is applied to control the motor voltage. The ideal power factor is obtained by multiplying a designated value of power factor by a compensation amount that is determined in accordance with the motor load, thereby ensuring that stable operation of the motor is achieved even under the no-load condition.

7 Claims, 11 Drawing Sheets

INDUCTION MOTOR CONTROL APPARATUS

BACKGROUND OF THE INVENTION

1. Field of the Invention

The present invention relates to an induction motor control apparatus, and in particular to a control apparatus which controls the power factor at which the motor operates, to provides a high efficiency of operation.

2. Description of the Related Art

A power factor control apparatus has been described in the prior art in U.S. Pat. No. 4,052,648 whereby the power factor of an induction motor is detected and the voltage applied to the motor is controlled accordingly, to thereby achieve an improvement in the operating efficiency of the induction motor by reducing the power consumed. With such an apparatus, the power factor of the induction motor is detected based upon a phase difference between voltage applied to the motor and the motor current. However, due to waveform distortion of the voltage and current of an induction motor, it is not possible to detect the power factor accurately by such a method. It has therefore been difficult to accurately control an induction motor to achieve a high level of operating efficiency. With that prior art control apparatus, the voltage applied to the induction motor is controlled such that the detected power factor is made to approach a preset value of power factor. If the preset value of power factor is made for example 80%, and the induction motor is operating under a condition of light load or no load, then it becomes necessary to excessively lower the voltage applied to the induction motor in order to make the detected value of power factor approach the preset power factor. Such an excessively low level of motor voltage results in stalling or cogging of the motor. To overcome that problem, it has been proposed to establish a cogging prevention voltage, separately from the preset power factor, and to compare the detected power factor with a cogging prevention voltage level, instead of with the preset value of power factor, to thereby prevent the occurrence of cogging or stalling when the induction motor is operating under a condition of no load or light load. However if that is done, the cogging prevention voltage cannot be set to a high value. Thus, it is not possible to accurately control the induction motor voltage when under low load or no load operation, so that highly efficient operation of the motor cannot be achieved. Moreover, if the induction motor is operated at an intermediate level of load, with a preset power factor of 80%, then since the preset value of power factor is excessively high with regard to that level of load, the voltage applied to the induction motor will be excessively low, and a high level of motor current, with the result that the power consumption of the motor will be increased. Thus in order to minimize the power consumption of the motor, it is necessary to manually adjust the preset power factor value of such a power factor control apparatus, in accordance with the load condition under which the induction motor is currently operating. Alternatively stated, if the preset power factor value is held fixed, with such an induction motor control apparatus, then is impossible to achieve efficient operation of the motor when changes occur in the motor load.

Another prior art induction motor control apparatus has been described in Japanese Patent Laid-open No. 64-50792, whereby efficient operation of an induction motor is to be achieved by varying the power factor based on the frequency of the power supplied to the motor, by using an inverter apparatus. With that apparatus, as shown in FIG. 3 of the specification of that invention, optimum power factor patterns for respectively different optimum power factor values at each of various frequencies are stored in a memory. The inverter operation frequency can be set, and the value of voltage applied to the motor can be set to obtain a fixed value of power factor corresponding to that frequency. However accurate voltage control for various different load conditions cannot be achieved.

Thus, with the first-mentioned prior art induction motor control apparatus, the accuracy of power factor detection is poor, due to waveform distortion of the induction motor voltage and current. With the second prior art induction motor control apparatus, with the frequency held fixed, the power factor will be held fixed even if variations in the motor load occur. Thus, it is not possible to achieve energy-saving operation for various different values of motor load.

SUMMARY OF THE INVENTION

It is an objective of the present invention to overcome the disadvantages of the prior art described above, by providing an apparatus for controlling the power factor of an induction motor, whose operation is not affected by waveform distortion of the induction motor voltage and current, and whereby a high accuracy of induction motor power factor detection can be achieved, and moreover whereby the induction motor can be controlled to operate at an optimum value of power factor, with the control apparatus operation being automatically varied in accordance with changes in the load of the induction motor, to thereby provide energy-saving operation even if there is wide variation of the level of motor load.

To achieve the above objectives, the present invention provides an induction motor control apparatus for controlling a supply of power from an AC power source to an induction motor, comprising:

voltage adjustment means coupled between said AC power source and said induction motor and controllable for varying an amplitude of voltage supplied to said induction motor;

power factor detection means for obtaining a value of detected power factor at which said induction motor is currently operating;

power factor designating means for producing an arbitrary designated value of power factor;

means for producing a load variation parameter corresponding in value to a level of load on said induction motor;

means for operating on said load variation parameter and said designated value of power factor to produce an optimum value of power factor;

comparator means for deriving an amount of difference between said optimum power factor and said detected power factor; and means for applying said difference amount to control said voltage adjustment means, to thereby vary the amplitude of said voltage supplied to the induction motor such as to reduce said amount of difference.

As a result, with an induction motor control apparatus according to the present invention, an optimum value of power factor is automatically varied in accordance with changes in the load condition of the induction motor, with the variation being based upon accurate detection of the motor power factor. The apparatus thereby enables operation of the motor at optimum power factor over the entire range of motor load, from no load to full load.

Furthermore, the voltage adustment means can be configured as a variable-frequency power supply, i.e. with the power source AC voltage being rectified and the resultant DC power voltage supplied to a DC-to-AC inverter whose output voltage frequency can be varied as required, to control the speed of rotation of the motor, and whose output voltage is controlled by the amount of difference between the optimum value of power factor and the detected power factor. In this way the speed of rotation of the induction motor can be set to a desired value, and the control apparatus of the present invention will ensure that an optimum value of power factor, and hence energy-saving operation, will be maintained at that speed of rotation.

DESCRIPTION OF PREFERRED EMBODIMENTS

A preferred embodiment of the present invention will be described referring to FIGS. 1A and 1B. This apparatus basically consists of a voltage adjustment device which in this embodiment is a triac 46, coupled between an AC power source 10 and a single-phase induction motor 12, and circuits which produce a control signal G that is applied to the voltage adjustment device for thereby controlling the level of voltage applied to the winding of the induction motor 12, such as to control the power factor at which the motor 12 operates, as described in detail hereinafter. The output voltage from the AC power source 10 appears on terminals 1 and 2, with the terminal 1 being connected through the triac 46 to a voltage supply lead 3, i.e. the voltage applied to the winding of the induction motor 12 is developed between the supply line 3 and a supply line 4 that is connected to the power source terminal 2. The apparatus includes a voltage detection circuit 16 for detecting the voltage that is actually supplied to the windings of the induction motor 12, and a power factor detection circuit 18 which receives a detection output signal Vuv from the voltage detection circuit 16 and also a current detection signal Iu from a current detector CT which detects the level of motor current in the winding of the induction motor 12.

The voltage detection circuit 16 consists of a pair of resistive voltage dividers, formed of resistors Ra, Rb and Rc, Rd respectively, which are respectively connected to the power supply leads 3, 4 of the induction motor 12, on which voltages Vu, Vv appear. The voltage-divided outputs from these dividers are applied to inputs of a differential amplifier 17, to obtain the output voltage Vuv which varies in proportion to the supply voltage of the induction motor 12. The waveform of the supply voltage applied to the motor is shown in the waveform diagram of FIG. 2, designated as U-V together with the waveform of the the output voltage Vuv from the amplifier 17.

The power factor detection circuit 18 includes an apparent power computing circuit 20 and a working power computing circuit 21. The apparent power computing circuit 20 is formed of an effective value converter 22, which detects the effective value Iu(rms) ($=I_{max}/\sqrt{2}$) of the AC current Iu (detected by the current detector CT) of the motor during one cycle, (i.e. the circuit 20 executes periodic sampling of the current Iu, and obtains a a peak value of current during one cycle, in each sampling operation, with the corresponding value of Iu(rms) then being computed), and an effective value converter 24 which, in a similar manner to the circuit 20, periodically detects the effective value Vuv(rms) ($=V_{max}/2$) of the AC voltage Vuv (detected by the voltage detection circuit 16) during one cycle. The apparent power computing circuit 20 further includes a multiplier 26 which multiplies together the effective current value Iu(rms) and the effective voltage value Vuv(rms), to thereby obtain a voltage which varies in proportion to the apparent power. That is to say, designating the value of that apparent power as P:

$$P = I_u(rms) \times V_{uv}(rms)$$

Figure 2:
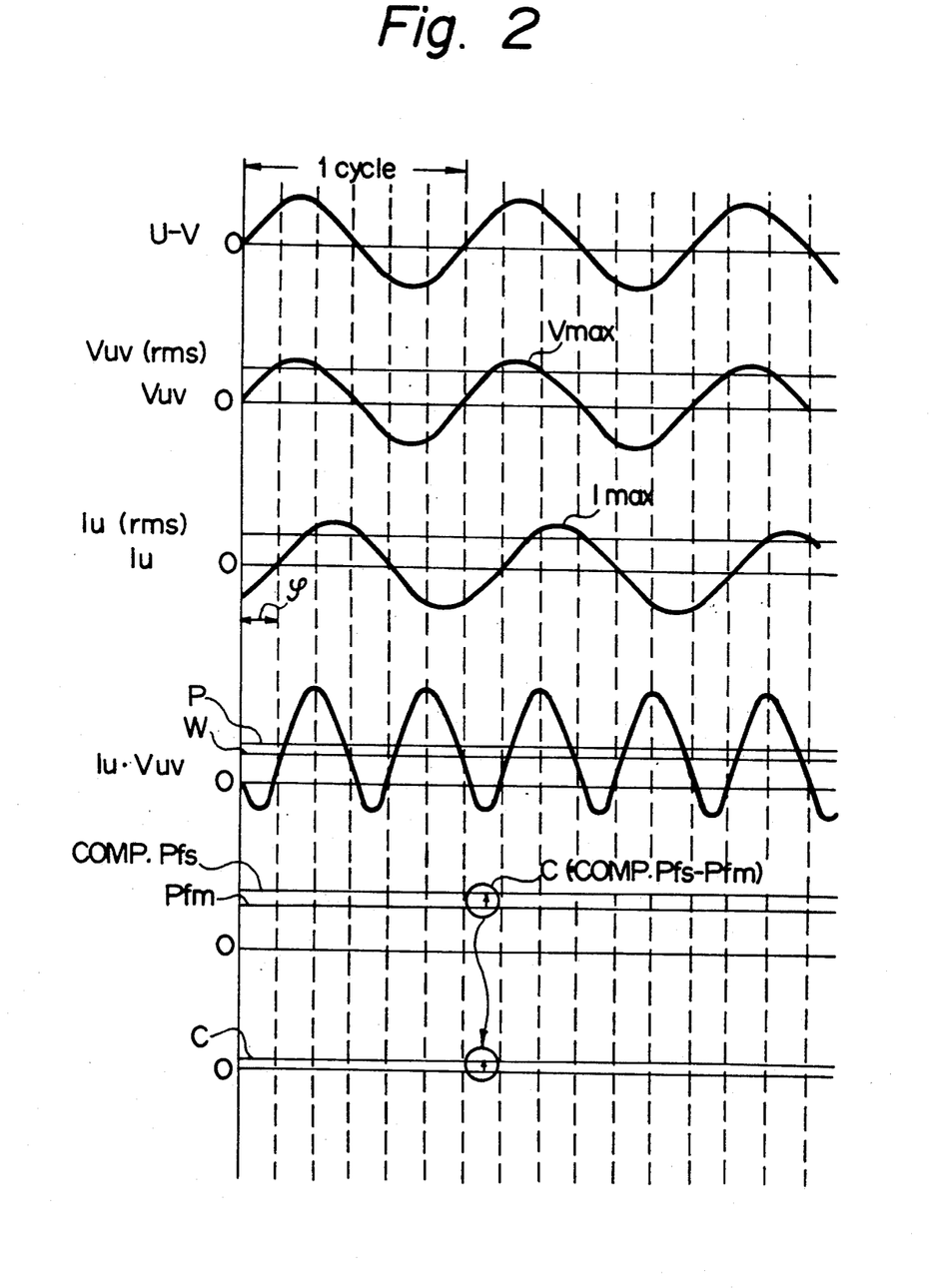
FIG. 2 is a timing diagram for the apparatus of FIGS. 1A and 1B.

The above operations are illustrated in the waveform diagrams of FIG. 2. In FIG. 2, the letter r expresses the phase angle between the voltage Vuv and the current Iu. Also in the power factor detection circuit 18, a working power computing circuit 21 serves to multiply together the current value Iu during one cycle (detected by detector CT) and the voltage Vuv during one cycle (detected by the voltage detection circuit 16), to obtain the output value Iu . Vuv (=working power W). The working power computing circuit 21 is formed of a multiplier 28 for executing the above multiplication, and an integrator circuit 34 formed of a resistor 30 and capacitor 32. The average value of the output produced from the multiplier 28 is thereby obtained from the integrator circuit 34 as a voltage signal whose level represents the working power value W, i.e. which varies in proportion to the working power of the induction motor 12.

As illustrated in FIG. 2:

$$W = I_u(rms) \cdot V_{uv}(rms) \cdot \cos r$$

The apparent power P and working power W values are supplied to a divider 35, which divides W by P to obtain as output an output signal Pfm whose level represents the detected power factor of the induction motor 12. That is to say:

$$Pfm = W/P = \frac{Iu(\text{rms}) \cdot Vuv(\text{rms}) \cdot \cos \gamma}{Iu(\text{rms}) \cdot Vuv(\text{rms})} = \cos \gamma$$

Detection of the motor power based on the apparent power and working power of the motor has the advantage that detection is not affected by waveform distortion of the voltage supplied to the motor. A detected power factor signal expressing the value Pfm is supplied to the optimum power factor generating circuit 36.

The optimum power factor generating circuit 36 is formed of a device 37 that is operable for generating a signal designating a predetermined arbitrary value of power factor Pfs, a function conversion circuit 38, and a multiplier 39 which generates an optimum power factor signal COMP.Pfs. In this embodiment, the working power value W is used as a load variation parameter, i.e. a value representing the current level of load on the motor. The function conversion circuit 38 executes conversion of the working power W in accordance with a predetermined function, to obtain a compensation factor COMP, i.e. as a signal level which varies in a predetermined manner in accordance with changes in the load on the induction motor 12. The multiplier 39 multiplies the compensation value COMP by the aforementioned arbitrary value of designated power factor Pfs, to obtain as output an optimum power factor COMP.Pfs. The detected power factor signal Pfm and the optimum power factor COMP.Pfs are compared in a comparator 42, to thereby obtain a power factor comparison signal C as output, which varies in accordance with the difference between Pfm and COMP. Pfs. The power factor comparison signal C is supplied to a control signal generating circuit 44.

The control signal generating circuit 44 serves to generate the aforementioned signal G which controls the triac 46, and includes a waveform shaping circuit 48 which executes level adjustment and waveform shaping of the voltage appearing between the output terminals 1, 2 of the AC power source 10, and a ramp waveform generating circuit 50 which generates a ramp-waveform signal Ra that is synchronized with the output signal from the waveform shaping circuit 48. the level of the power factor comparison signal C and the ramp signal Ra are compared by a comparator 52 to obtain a rectangular waveform signal D, which is supplied to a drive circuit 54. The pulse width of the signal D is thereby varied in proportion to the level of the power factor comparison signal C, while in addition the signal D is synchronized with zero-crossing points of the supply voltage produced from the AC power source 10. A corresponding drive signal that is produced from the drive circuit 54 (which will typically consist of a current amplifier circuit or a pulse transformer) can therefore be applied as the control signal G to the triac 46.

Figure 3:
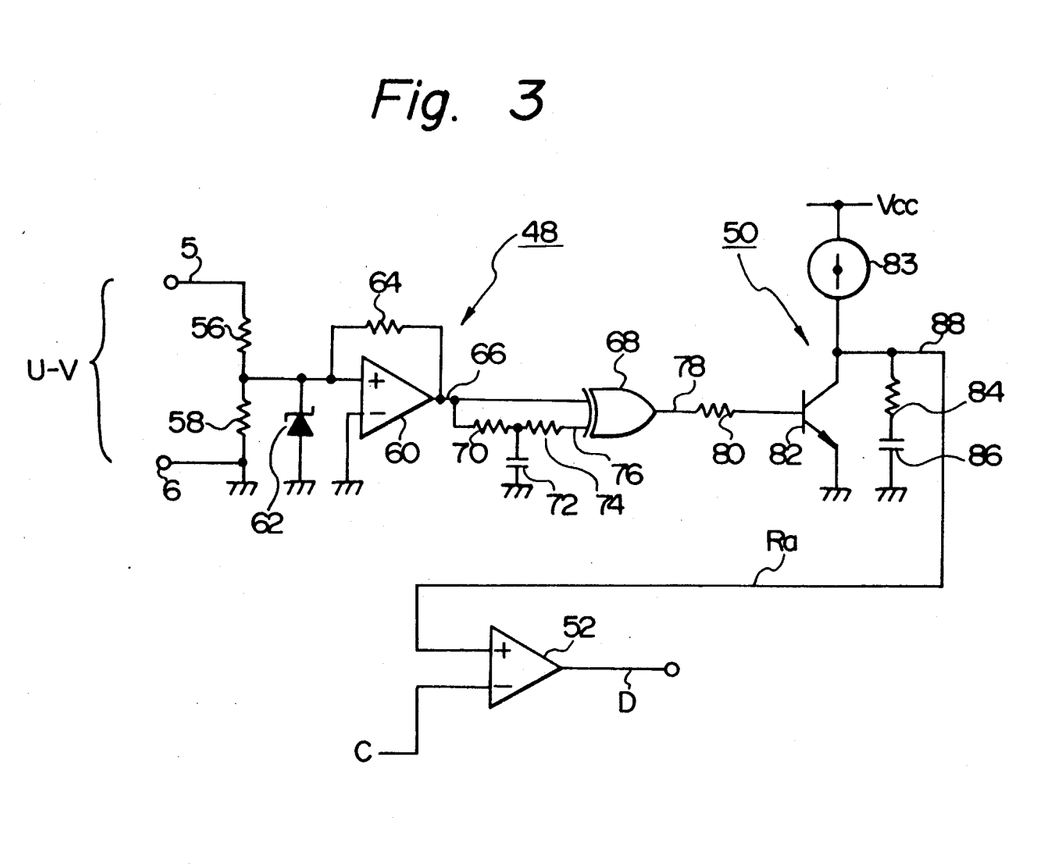
FIG. 3 is a circuit diagram of a specific example of a voltage adjustment circuit in the embodiment of FIGS. 1A and 1B.
Figure 4:
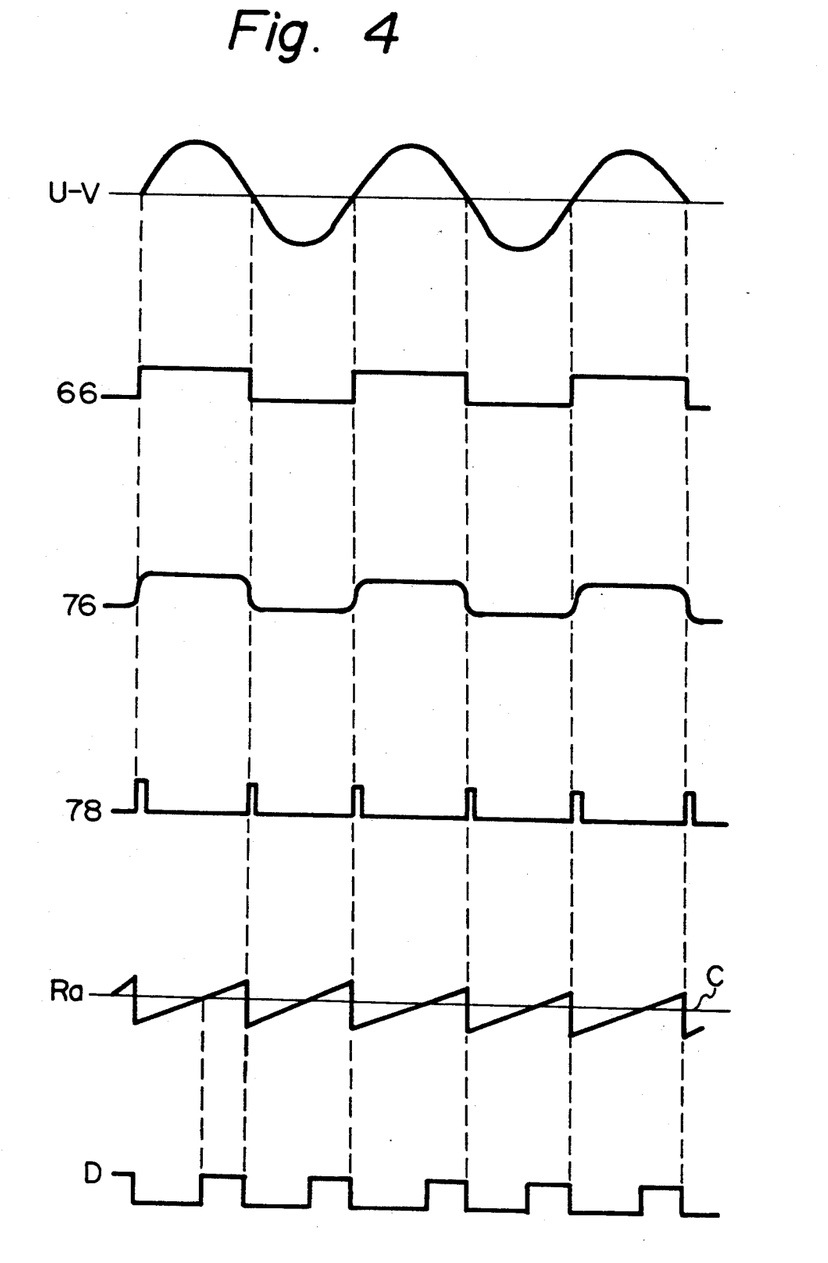
FIG. 4 is a timing diagram for the circuit of FIG. 3.

FIG. 3 shows a specific configuration for circuits 48, 50, 52 of the control signal generating circuit 44, and a corresponding timing chart is shown in FIG. 4. In FIG. 3, a voltage signal U-V which is identical in phase and equal to or proportional in amplitude to the voltage appearing between the output terminals 1, 2 of the AC power source 10 is applied to an operational amplifier 60 via a voltage divider formed of resistors 56, 58. Although not shown in the drawings, a device such as a voltage transformer is used to apply the input voltage to the voltage divider in FIG. 3, i.e. with the primary winding of the transformer coupled between terminals 1, 2 in FIGS. 1A and 1B and the secondary winding coupled between the terminals 5 and 6 in FIG. 3. A zener diode 62 is provided to protect the operational amplifier 60. A feedback resistor 64 determines an amount of hysteresis of the circuit based on the operational amplifier 60, in conjunction with the ratio of the values of resistors 56, 58, such that an output rectangular-wave signal is produced as signal 66 from the operational amplifier 60, as shown 66 in FIG. 4, having zero-crossing points that are very precisely synchronized with those of the AC supply voltage produced from the AC power source 10. That output signal 66 is supplied to one input of an exclusive-OR gate 68, and is also supplied through an integrator circuit formed of a resistor 70 and capacitor 72, via a resistor 74, to the other input of the exclusive-OR gate 68. As a result, the waveform shown as 76 in FIG. 4 appears at that other input of the exclusive-OR gate 68.

The wmfs 76 and 66 are compared by the exclusive-OR gate 68, whereby narrow pulses 78 shown in FIG. 4 are generated. These pulses are supplied to the ramp generating circuit 50. The ramp waveform generating circuit 50 is formed of a transistor 82, resistor 84 and capacitor 86. The base of the transistor 82 is coupled through the resistor 80 to the output of the exclusive-OR gate 68, while the collector of transistor 82 is connected to a stabilized current source 83, and the emitter of the transistor is connected to ground potential. Each time a pulse is applied to the base of the transistor 82, the transistor is set in the conducting state, causing the line 88 to go to zero (i.e. ground) potential. The transistor 82 enters the non-conducting state in synchronism with each falling edge of the pulses 78, whereupon charging of the capacitor 86 from the current source 83 begins. As a result, a ramp voltage waveform Ra shown in FIG. 4, varying linearly with time, appears on the line 88.

The resistor 84 is provided to limit the level of discharge current which flows through the capacitor 86 when the transistor 82 enters the conducting state.

As is clear from FIGS. 3 and 4, the power factor comparison signal C and the ramp signal Ra are compared by the comparator 52, to thereby obtain the rectangular waveform signal D as output. Since the pulse width of the drive signal G that is produced from the drive circuit 54 is proportional to the pulse width of the rectangular waveform signal D, a reduction of the pulse width of signal D results in a reduction of the conduction angle of the triac 46, thereby reducing the voltage applied to the induction motor 12. In this way, the control signal generating circuit 44 executes control in accordance with the difference between the detected power factor Pfm and the optimum power factor COMP.Pfs.

Figures 1, 1A:
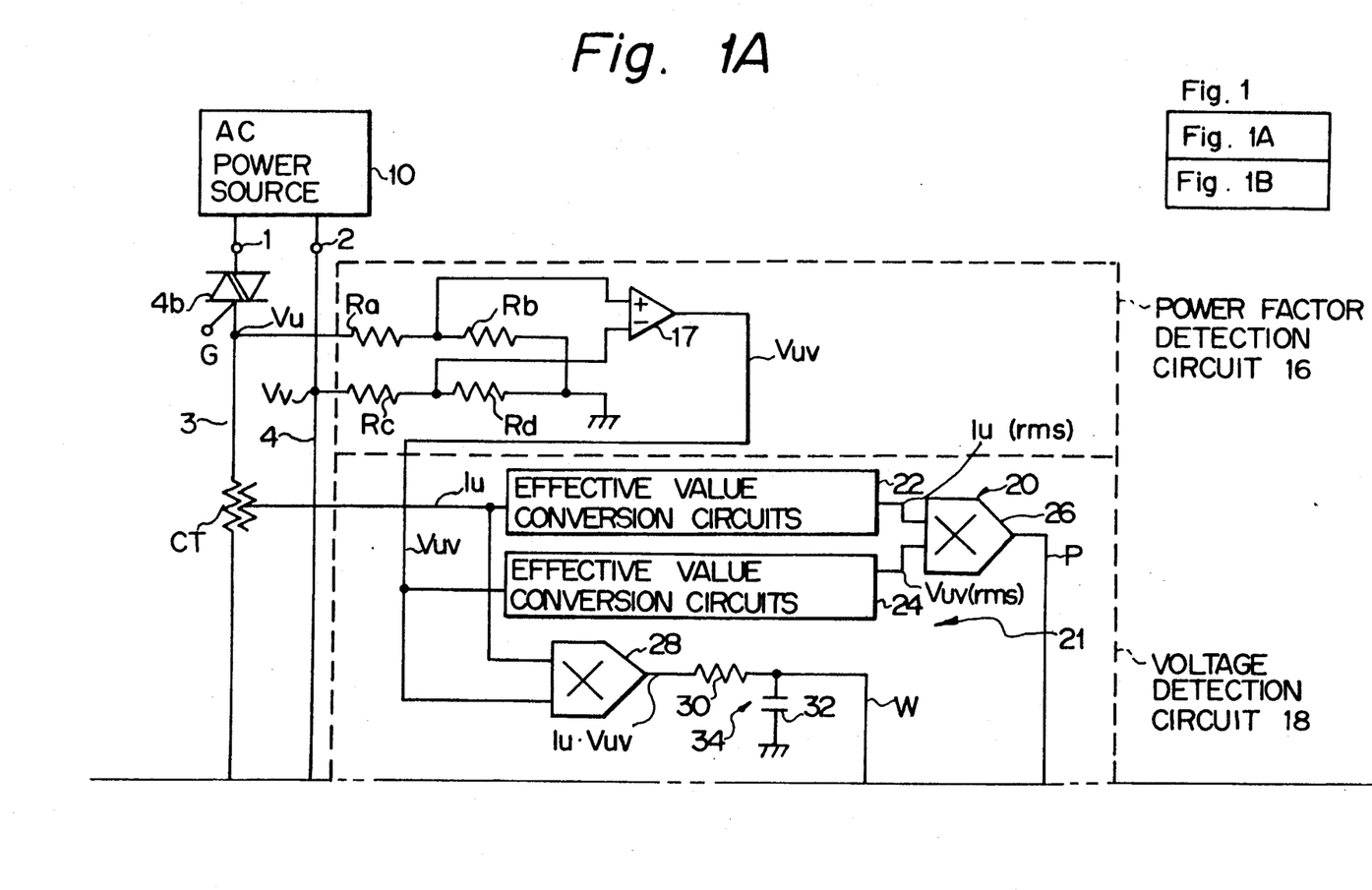
FIGS. 1A and 1B represent is a block diagram of a first embodiment of an induction motor control apparatus according to the present invention.
Figure 1B:
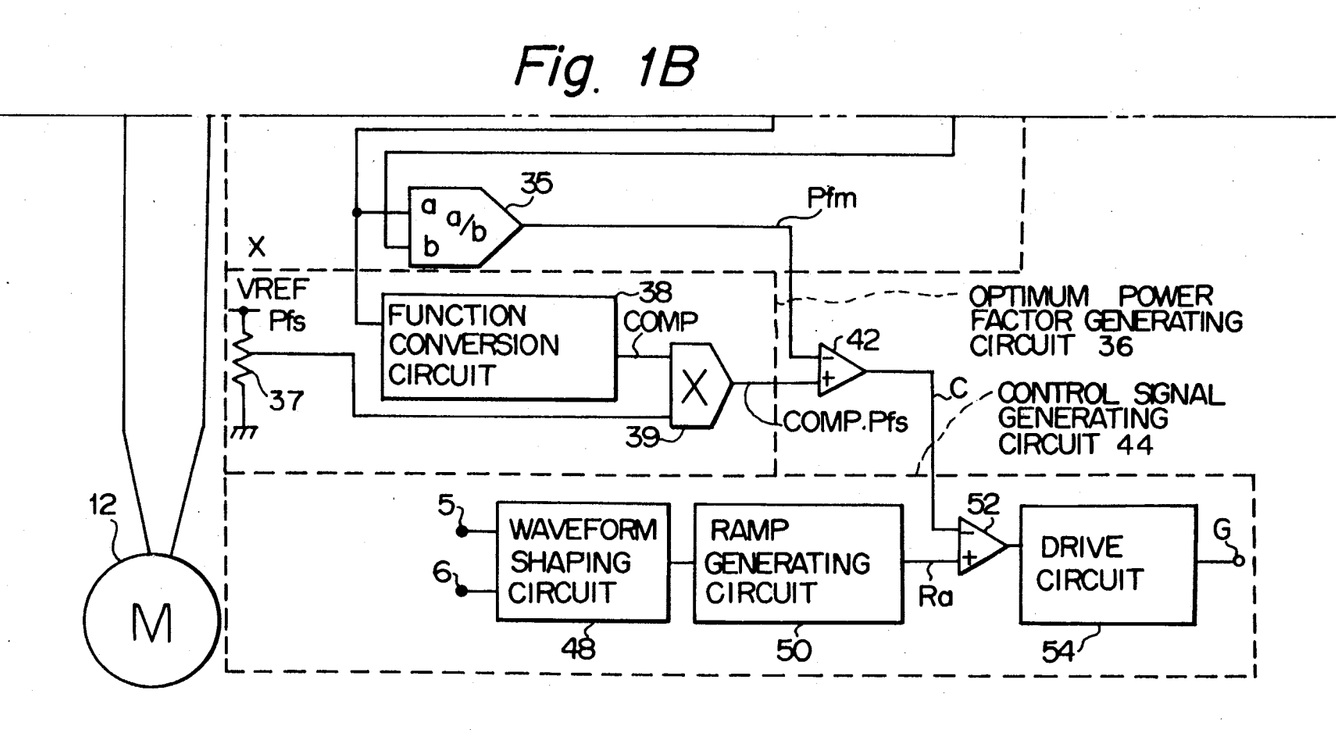
Figure 5:
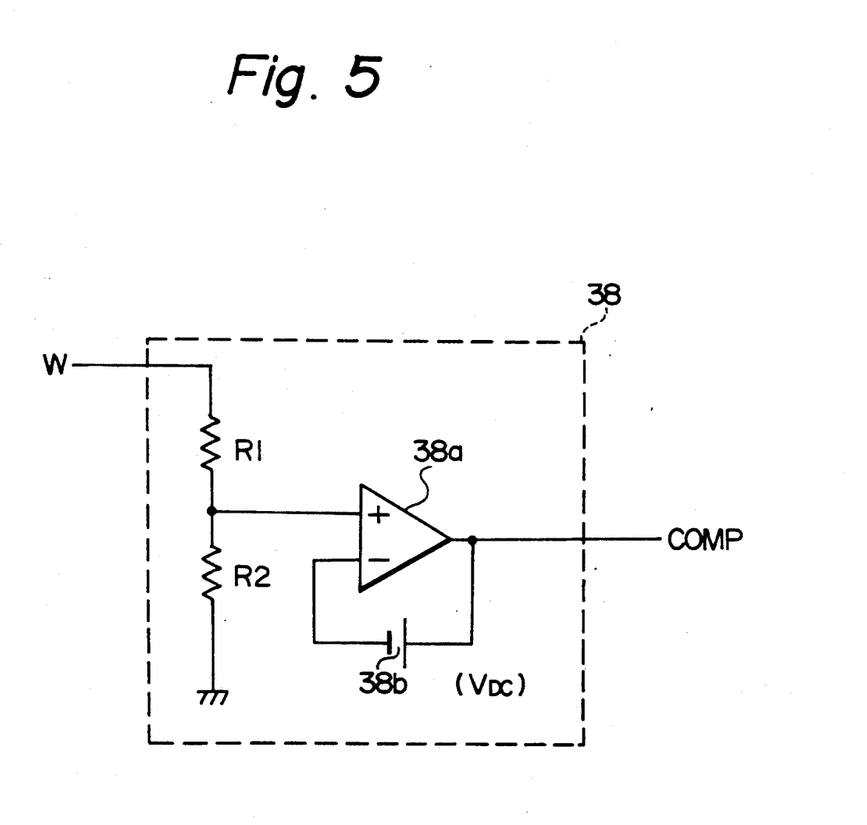
FIG. 5 is a circuit diagram of a function conversion circuit in the embodiment of FIGS. 1A and 1B.
Figure 6:
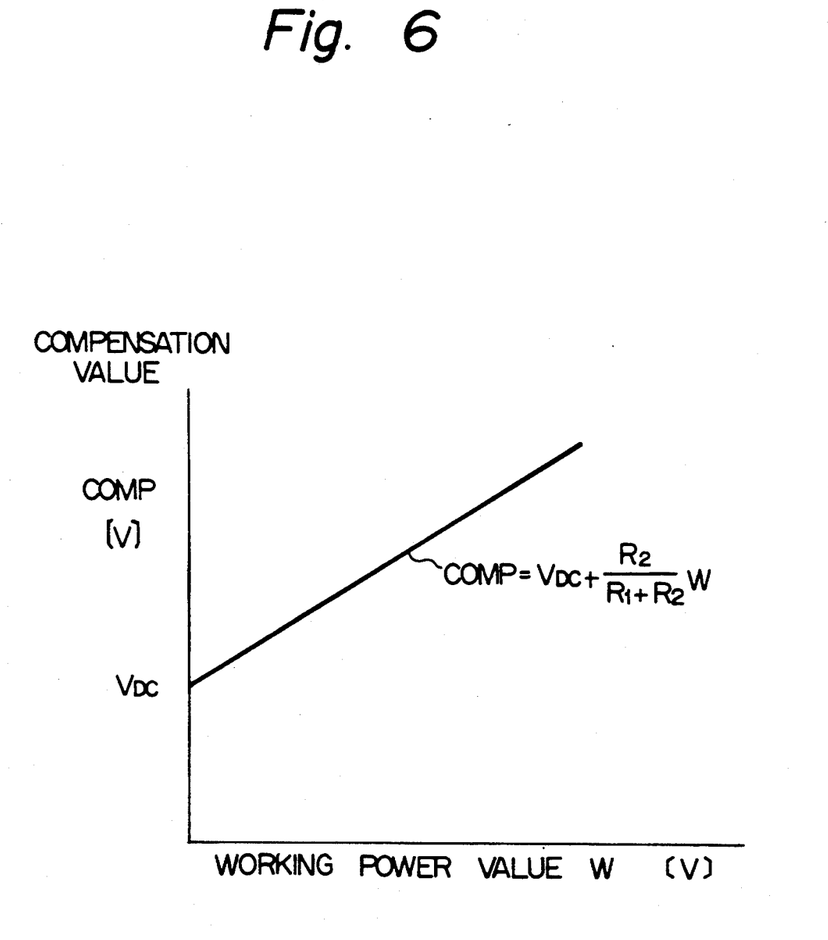
FIG. 6 is a graph to illustrate the operation of the circuit of FIG. 5.

FIG. 5 is a specific circuit example of the function conversion circuit 38 of FIGS. 1A and 1B, while FIG. 6 is a graph showing the output produced from the circuit of FIG. 5. In FIG. 5, the signal whose voltage level expresses the working power W, supplied from the power factor detection circuit 18, is voltage-divided by a resistive voltage divider formed of resistors R1, R2, and the resultant voltage is supplied to a simple adder circuit formed of an operational amplifier 38a and a standard voltage source 38b which produces an output voltage $V_{DC}$. The output from the voltage divider is thereby added to $V_{DC}$, to obtain an output signal representing the compensation value COMP. The function converter operation is expressed as:

$$COMP = V_{DC} + \frac{R2}{R1 + R2} W$$

i.e. the circuit is a first-order function converter.

FIG. 6 shows the relationship between the working power W and the compensation value COMP. As shown, the lower the value of working power W, the smaller becomes the compensation value COMP. Since the working power of an induction motor becomes lower as the motor load is reduced, the optimum power factor of such a motor falls as the motor load is reduced, and rises in accordance with an increase in load. Thus for example when the motor is running in the no-load state, since the optimum power factor that is produced in this embodiment will have a low value, the motor drive voltage will not be made excessively low, so that stalling or cogging of the motor can be prevented. Moreover, due to the fact that the motor voltage is at an optimum level in such a case, the load current, working power, non-working power, and apparent power, are all significantly improved, as described in detail hereinafter.

Figure 7:
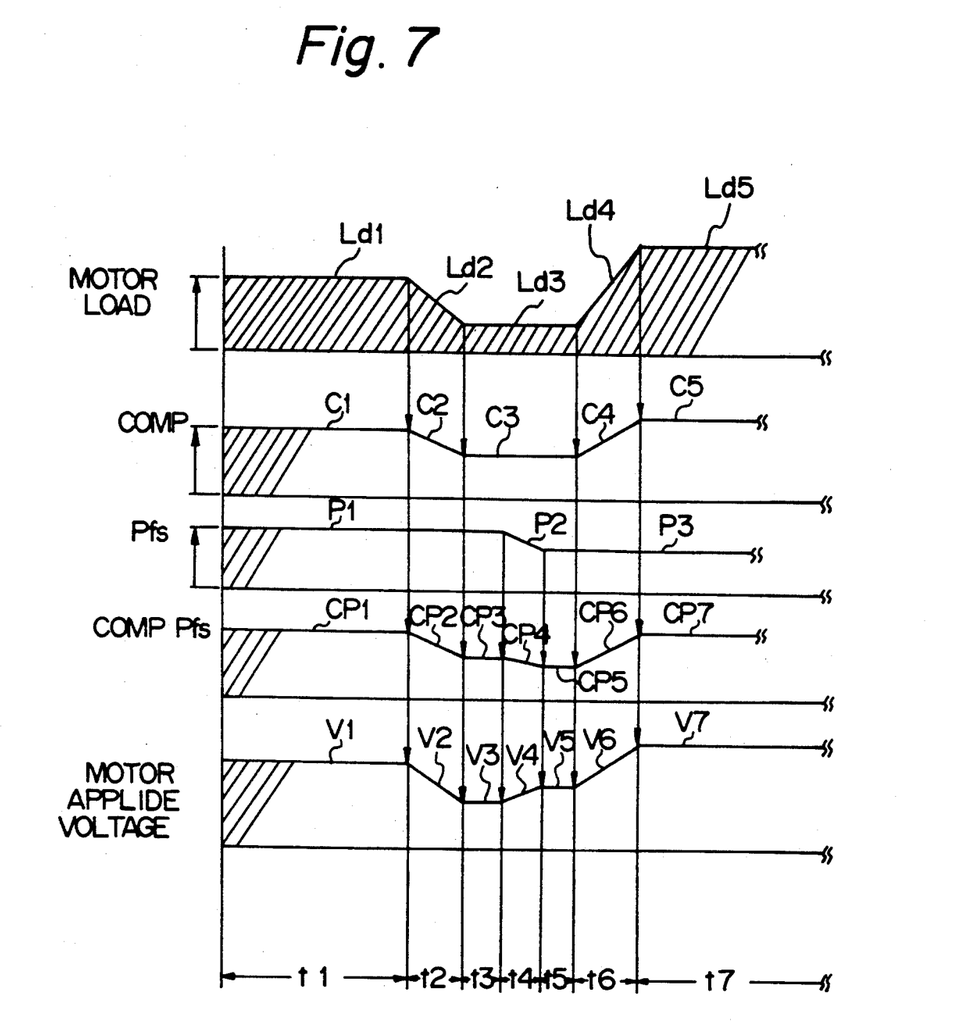
FIG. 7 is a chart showing relationships between variations in motor load, optimum power factor, and motor applied voltage, for an induction motor controlled by the embodiment of FIGS. 1A and 1B.

FIG. 7 is a diagram showing relationships between changes in load on the induction motor 12 and corresponding changes in the compensation value COMP, the designated power factor Pfs, the optimum power factor COMP.Pfs, and the motor voltage. During the time interval t1, the motor operates with a load that is stable at a level Ld1, and during that time the compensation value COMP is stable at the level C. Since in that condition the optimum power factor COMP.Pfs is stable at the level CP1, the motor voltage is held stable at a level v1. During a succeeding time interval t2, the motor load falls, as indicated by Ld2, and since the working power (which expresses the motor load condition) thereby falls, the compensation value COMP will also fall, as indicated by c2, and the optimum power factor COMP.Pfs accordingly fall as indicated by CP2. During that time interval, the motor voltage is caused to fall as indicated by v2, such that the the detected power factor will be made to coincide with the optimum power factor COMP.Pfs. During the next time interval t3, the motor load is held stable at a low level Ld1, and the optimum power factor COMP.Pfs is held stable at a level CP3 that is lower than the level CP1, while the motor voltage is held stable at the level v3.

It is now assumed that during the next time interval t4, while the motor load is being held stable at the level Ld3, the designated power factor Pfs is reduced, as indicated by P2. As a result, the optimum power factor COMP.Pfs will accordingly fall, as indicated by CP4. During that time interval, the motor voltage is increased, as indicated by v4, such that the detected power factor of the motor will be caused to coincide with the optimum power factor COMP.Pfs.

During the succeeding time interval t5, the designated power factor Pfs is held fixed at the value P3, and the optimum power factor COMP.Pfs is thus held stable at the level CP5, while the motor applied voltage is held stable at the level v5.

During the next time interval t6, the motor load increases, as indicated by Ld4, and the compensation value COMP therefore rises as indicated by C4. Thus during that time interval, the optimum power factor COMP.Pfs increases, as indicated by CP6, and the motor voltage is increases such as to make the detected power factor coincide with the optimum power factor COMP.Pfs.

During the succeeding time interval t7, the motor load is held stable at level Ld5, and the compensation value COMP is thus fixed at the level C5, while the optimum power factor COMP.Pfs is held stable at the level CP7, and the motor voltage is held at the level V7.

In this way, operation at the optimum power factor is achieved in spite of various changes in the load on the induction motor, so that energy-saving operation is ensured throughout the full range of motor loads, from no-load to full-load. Moreover, due to the fact that the optimum power factor value is reduced in accordance with a reduction of motor load, there is no danger of the voltage applied to the motor by the control apparatus becoming excessively low when the motor load is very low, so that cogging and stalling of the motor are effectively prevented.

Figure 8:
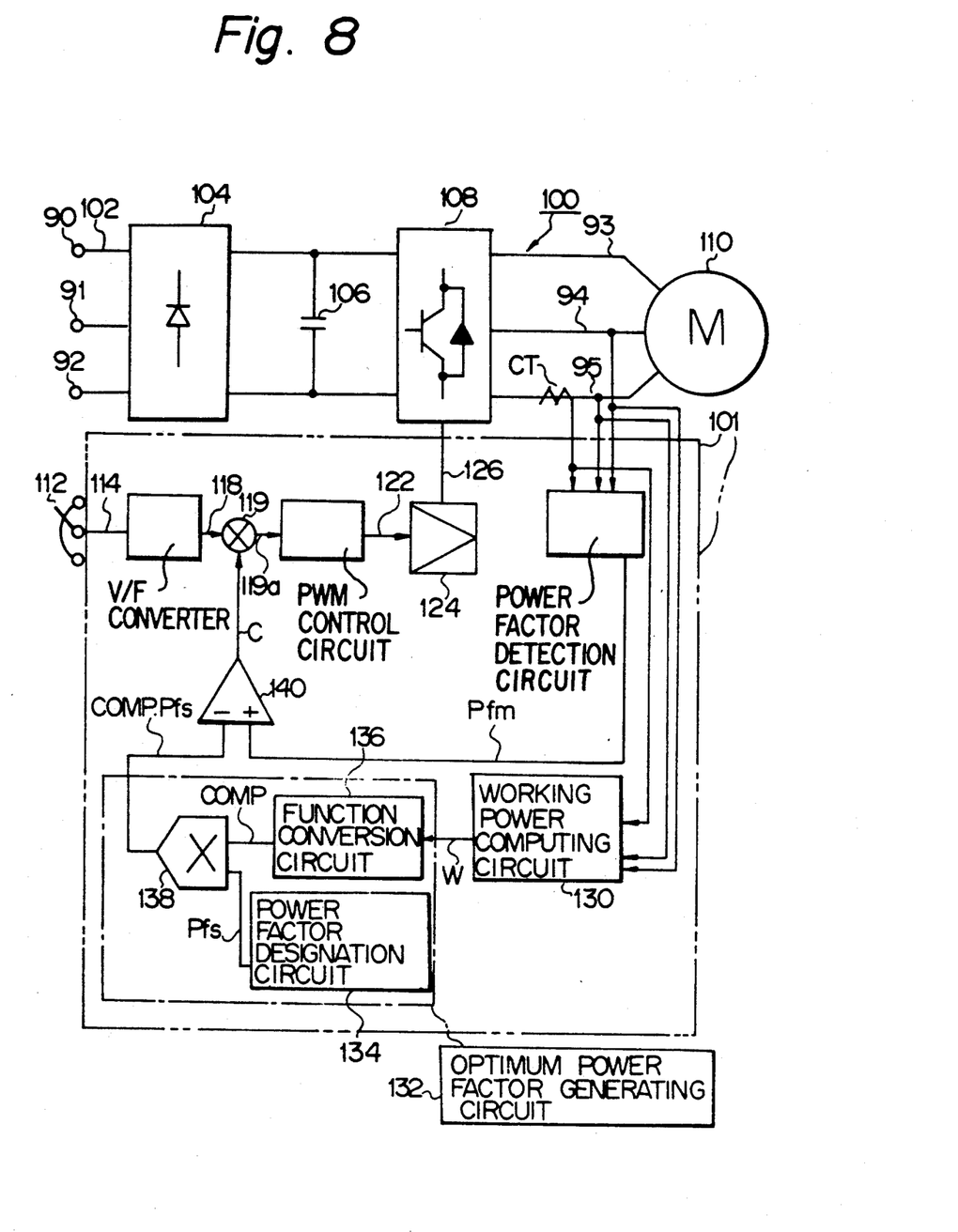
FIG. 8 is a block diagram of a second embodiment of an induction motor control apparatus according to the present invention.

FIG. 8 is a block diagram of a second embodiment of an induction motor control apparatus according to the present invention. The basic principles of this embodiment are identical to those of the first embodiment described above. However with the second embodiment, the apparatus also functions as a variable-frequency power source. That is to say, in addition to the motor voltage being controlled by the apparatus such as to mantain the motor operation at an optimum value of power factor in spite of wide changes in motor load, the frequency of the AC voltage supplied to the motor by the control apparatus can be varied by the user as required, to thereby vary the motor speed of rotation. When a particular value of AC supply frequency has been set, the voltage supplied to the motor is automatically adjusted by the control apparatus, based on the current level of motor load and a preset value of designated power factor, to provide optimum power factor operation of the motor.

In FIG. 8, a 3-phase power source (not shown) is connected to three input terminals 90, 91, 92 of a rectifying circuit 104, to be rectified to obtain a DC power voltage which is then smoothed by a smoothing capacitor 106. The smoothed DC voltage is supplied to a DC-to-AC inverter circuit 108 (referred to in the following simply as the inverter circuit 108) for producing a 3-phase AC output supply whose voltage level and frequency are determined by a control computing circuit 101 as described hereinafter. That 3-phase AC supply is applied to an induction motor 110. A current detector CT produces an output signal in proportion to the current flowing in one of the three supply leads 93, 94, 95 of the motor, with that current detection signal being supplied to the control computing circuit 101 together with the voltage appearing between two of the supply leads 93 to 95, i.e. the voltage of one phase of the supply applied to the motor 110, for use in determining the working power and apparent power of the motor as for the first embodiment.

The inverter circuit 108 is based on semiconductor switching devices, which will be assumed to consist of transistors in this embodiment. DC to AC conversion by the inverter circuit 108 is achieved by a PWM (pulse width modulation) control signal that is supplied to the inverter circuit 108 from the control computing circuit 101, i.e. the output voltage appearing on each of the supply leads 93 to 95 is basically a train of pulses whose pulse width varies cyclically with time and whose average value constitutes the supply voltage. The frequency of that cyclic pulse width variation therefore determines the speed of rotation of the motor 110.

In the control computing circuit 101, a voltage-to-frequency converter circuit 116 receives a frequency designation signal 114, specifying the frequency required for the AC supply produced by the inverter circuit 108, with that signal 114 being produced from a device 112 which can for example be a manually operable device such as a potentiometer, producing the signal 114 as a voltage level which is varied to produce a resultant variation in the frequency. The voltage-to-frequency converter circuit 116 produces an output voltage signal 118 which varies sinusoidally with a frequency that is determined by the level of the frequency designation signal 114. That voltage signal 118 is then multiplied by a power factor comparison signal C, produced from a comparator 140 as described hereinafter, and the result of that signal multiplication, designated as signal 119a, is supplied to a PWM control circuit 120. The above operations are illustrated in the waveform diagram of FIG. 9, in which for ease of understanding the output signal 118 from the voltage-to-frequency converter circuit 116 is shown as fixed in level. Within the PWM control circuit 120, the signal 119a is compared with a ramp-waveform signal Rb, to obtain a pulse width modulated output signal 122 as shown. The PWM signal 122 is then supplied to a base drive circuit 124, which generates a base drive signal 126 for the inverter circuit 108.

Figure 10:
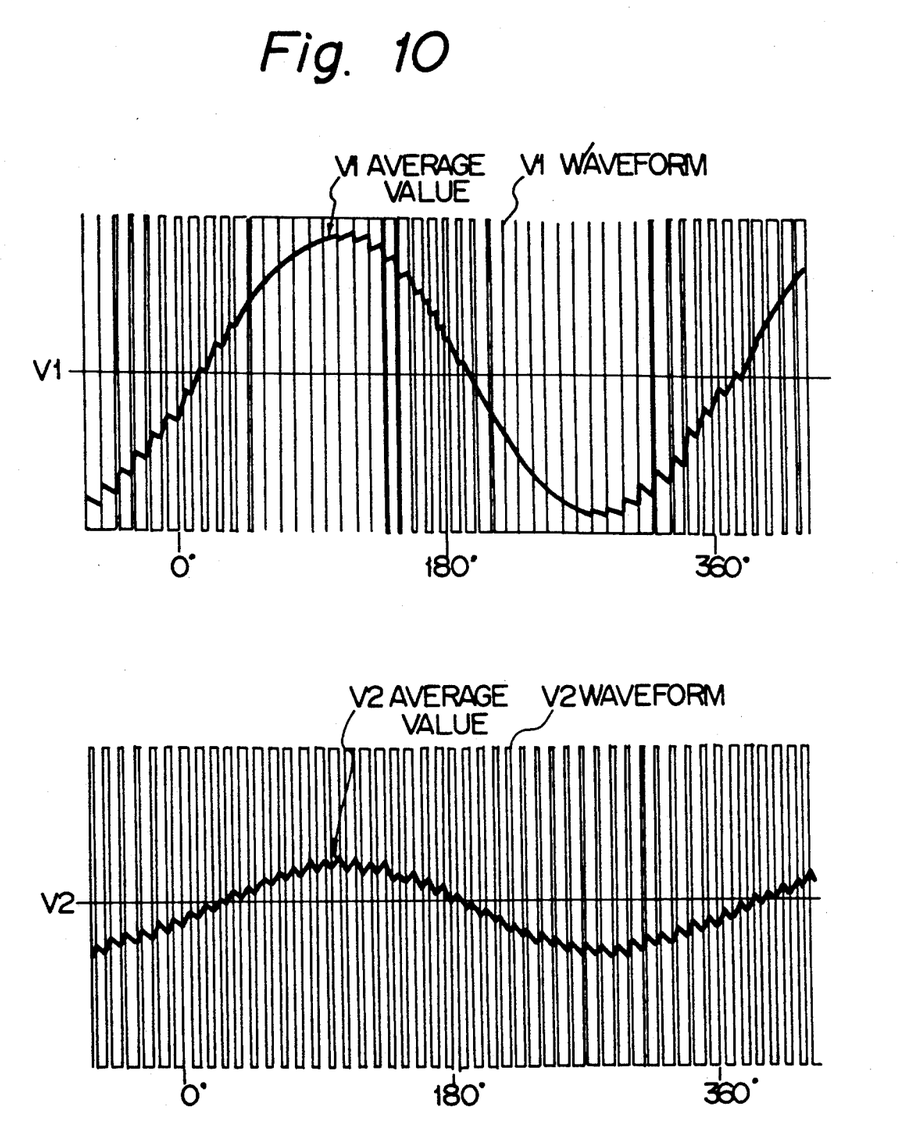
FIG. 10 illustrates waveforms of motor applied voltage produced in the embodiment of FIG. 8.

Since DC-to-AC inverters are now very well known in the art, description of the internal configuration of the inverter circuit 108 will be omitted. However it can be understood that when the average pulse width of the sinusoidally varying PWM signal 122 is small, each of the three output phases from the inverter circuit 108 will become low in voltage, while conversely a high value of pulse width of the PWM signal 122 will result in a high value of supply voltage being applied to the motor 110. This is illustrated in FIG. 10, in which as shown in the upper diagram, the average value V1 of the voltage of each phase of the outputs from the inverter circuit 108 is relatively high when the pulse width of PWM signal 122 is relatively large, while as shown in the lower diagram, the average value of voltage V1 becomes low when the PWM pulse width is made small.

It can thus be understood from the above that the frequency of the sinusoidal variations in average level of supply voltage V1 applied to the motor 110 from the inverter circuit 108 is determined by the level of the frequency designation signal 114 supplied from the frequency designating input device 112, while the average level of the supply voltage V1 is controlled by the value of the power factor comparison signal C.

The control computing circuit 101 further includes a power factor detection circuit 128, which detects the actual power factor under which the motor 110 is currently operating. This is achieved by the same means as for the first embodiment described hereinabove, so that detailed description will be omitted, i.e. the power factor detection circuit 128 includes circuits for periodically detecting the values of working power W and apparent power P of the motor 110, and for dividing the value W by P to produce an output signal whose level represents the detected power factor Pfm of the motor. Detection of the working power W and apparent power P by the power factor detection circuit 128 is based upon a current detection signal from a current detector CT which detects the level of current in one of the supply leads 93, 94, 95 of the motor 110, as shown, and the voltage of one supply phase, i.e. the voltage that is developed between two of the supply leads 93, 94, 95. Otherwise, the internal configuration of the power factor detection circuit 128 can be identical to the combination of the voltage detection circuit 16 and power factor detection circuit 18 in the first embodiment of FIGS. 1A and 1B. With this embodiment, as for the first embodiment, the working power W of the motor is used as a parameter expressing the level of motor load. For ease of understanding, a working power computing section 130 is shown for deriving a signal representing the working power W, however it should be understood that in practice, that signal would be generated internally within the power factor detection circuit 128, so that the working power computing section 130 is not actually essential. The working power W signal is supplied to an optimum power factor generating circuit 132, which produces an optimum power factor COMP.Pfs as for the first embodiment, and the level of that signal is compared with the detected power factor signal Pfm from the power factor detection circuit 128 by the comparator 140, to obtain the aforementioned power factor comparison signal C which is supplied to the multiplier 119.

The optimum power factor generating circuit 132 is formed of a designated power factor generating circuit 134, which produces a signal representing an arbitrary value of designated power factor Pfs, and which can include an externally operable device such as a potentiometer as for the first embodiment, whereby a user can set a desired value of Pfs. The optimum power factor generating circuit 132 further includes a function converter circuit 136, for receiving the working power W signal from the working power computing section 130, i.e. a signal whose level varies in accordance with the motor load, and for outputting a corresponding compensation value COMP, with that compensation value COMP and the designated power factor Pfs being multiplied together by a multiplier 138, to obtain the optimum power factor COMP.Pfs.

The optimum power factor COMP.Pfs and the detected power factor Pfm are respectively applied to the inverting and non-inverting input terminals of the comparator 140, to obtain as output from the comparator the aforementioned power factor comparison signal C which is applied to the multiplier 119.

Figure 9:
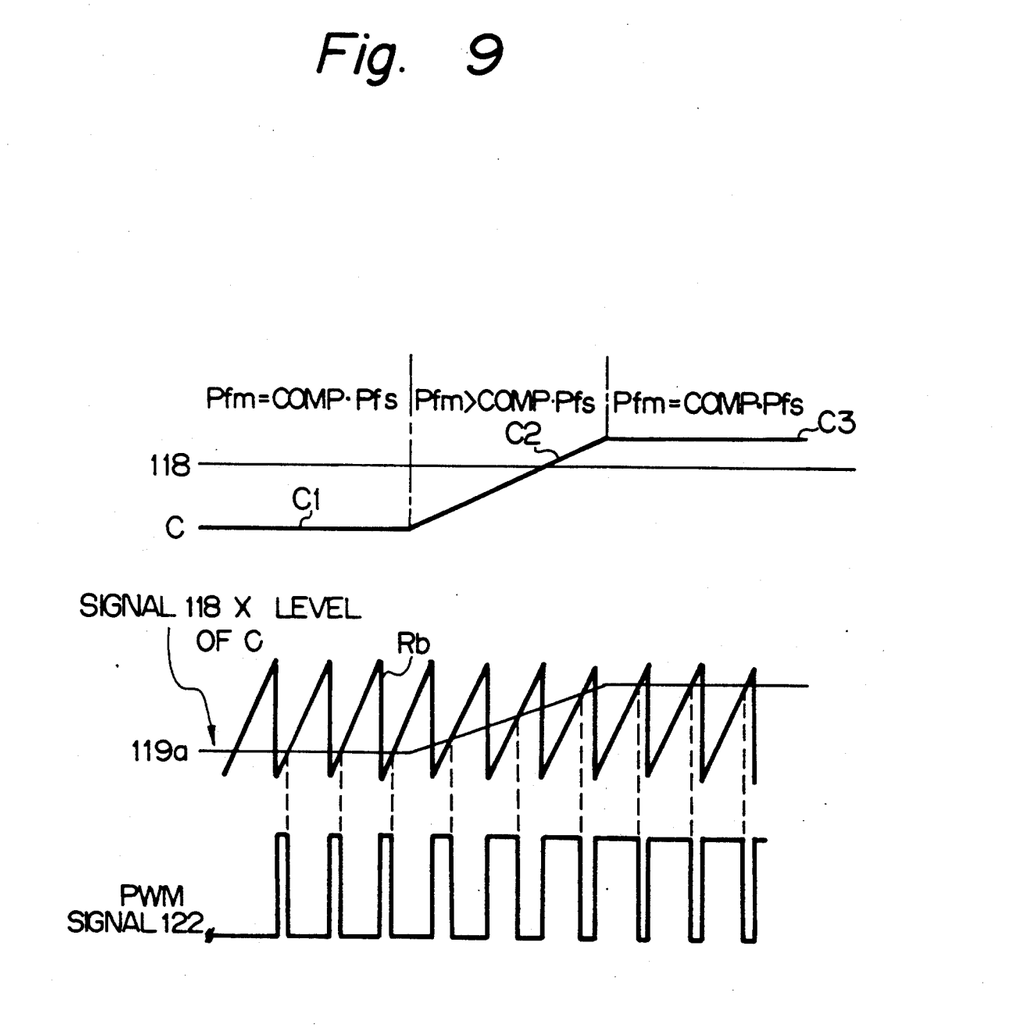
FIG. 9 is a timing diagram for the circuit of FIG. 8.

As shown in the timing chart of FIG. 9, assuming the output signal 118 from the voltage-to-frequency converter circuit 116 to be constant (for ease of description), the power factor comparison signal C varies as follows. When the detected power factor Pfm and the optimum power factor COMP.Pfs are both at the same level, then the power factor comparison signal C remains at a fixed level C1. If the detected power factor Pfm exceeds the optimum power factor COMP.Pfs, then signal C increases as indicated by C2 in FIG. 9. When the detected power factor Pfm again becomes equal to the optimum power factor COMP.Pfs, the power factor comparison signal C becomes stablized at a value C3 which is higher than C2.

The multiplier 119 functions as an optimum voltage generator, by multiplying together the values of the signals 118 and C, to obtain as output an optimum voltage designating signal 119a, which is a periodically varying signal whose amplitude is determined by the value of the power factor comparison signal C and whose frequency is determined by the value of the signal 114. The PWM signal 122 is thereby produced from the PWM control circuit 120 (which can be accomplished by methods that are well known in the art, so that detailed description will be omitted). As shown in FIG. 9, the PWM signal 122 has a relatively small value of pulse width when the level of signal C is low, with that pulse width increasing in accordance with increase in the level of signal C. The voltage of the 3-phase outputs of the inverter circuit 108 is thereby controlled, as described above, based on the power factor comparison signal C, with the AC frequency of these 3-phase outputs being determined by the frequency designating voltage signal 114 supplied to the voltage-to-frequency converter circuit 116.

The average value curve V1 in FIG. 10 illustrates the average output voltage produced from the inverter circuit 108 when the level of the power factor comparison signal C is relatively high (i.e. when the motor 110 is operating under a high load), while the average value curve V2 in FIG. 10 illustrates the average output voltage waveform from the inverter circuit 108 when the level of the power factor comparison signal C is relatively low (i.e. when the motor 110 is operating under a low load). In that case, the value of detected power factor Pfm obtained from the working power computing section 130 will be low, so that the compensation value COMP that is produced from the function converter circuit 136 will also be lowered. Hence, the level of the optimum power factor COMP.Pfs is also lowered. The difference between the resultant values of Pfm and COMP.Pfs, i.e. the signal C, will be lowered thereby, causing a reduction of the supply voltage produced from the inverter circuit 108. The working power and the non-effective power of the motor 110 are thereby both reduced substantially.

On the other hand when the motor load becomes large, the detected power factor Pfm also becomes high, while the values of COMP and hence of COMP.Pfs are also increased. The net result is to cause an increase in the level of signal C, whereby the output voltage produced from the inverter circuit 108 is increased, until the motor 110 is supplied with a voltage which results in operation at the optimum power factor. That is to say, the overall result of the operation of the feedback loop that is constituted by the inverter circuit 108, the power factor detection circuit 128, the working power computing section 130 and optimum power factor generating circuit 132, the comparator 140, multiplier 119, PWM control circuit 120, and base drive circuit 124, is to establish a condition in which a level of output voltage from the inverter circuit 108 is produced such that the detected power factor Pfm of the motor is made almost exactly equal to the value of optimum power factor COMP.Pfs produced from the multiplier 138.

It will be understood from the above that it is a basic advantage of the present invention that the feedback control which is used to stabilize the power factor of an induction motor close to a desired value under a condition of relatively high load is modified (by the compensation value COMP, which is affected by the current level of motor load, as represented by a parameter such as the working power W) such as to prevent the motor voltage from becoming excessively low when the motor is operated under a condition of very light load or no load. For example in the embodiment of FIG. 8, if the detected power factor Pfm were to be simply compared with the specified power factor value Pfs, and the resultant difference used (as signal C) to control the motor voltage, then that advantage of the invention would not be achieved.

With an induction motor control apparatus, the voltage applied to the motor can continuously varied automatically such as to maintain the motor operation at a high value of power factor in spite of variations in motor load. Moreover an optimum value of power factor is maintained from full load down to the no-load condition, without the need for manual adjustment and without danger of motor stalling or cogging when in a the no-load condition. A high degree of energy-saving can thereby be achieved.

The following test results were obtained from a prototype of an induction motor control apparatus based on an inverter, in accordance with the second embodiment described above, when connected to an induction motor.

|  | Motor current (A) | Working power (KWH) | Non-effective power (KVAR) | Apparent power (KVAH) |
|---|---|---|---|---|
| Without control apparatus | 9.324 | 0.321 | 3.232 | 3.248 |
| With control apparatus | 0.847 | 0.11 | 0.277 | 0.298 |
| Improvement factor | −91% | −65.7% | −91.4% | −90.8% |

The test conditions were as follows:
1. Motor used: 5.5 KW/4-pole
2. Power source voltage: 200 V
3. Optimum power factor under no-load operation: 45%
4. Optimum power factor under full-load operation: 83%
5. Motor voltage under no-load operation: 50 V
6. Motor load value: no load
7. Inverter output frequency: 50 Hz As will be clear from the above test data, the prototype induction motor control apparatus according to the present invention enabled the motor current, when operating in the no-load condition, to be reduced to approximately one tenth of the value that flows when the apparatus is not utilized. In addition, the working power is reduced by approximately 65.7%, and the non-effective power and apparent power are each reduced to approximately one tenth of the values for the case in which the apparatus is not used. Moreover, no problems with regard to cogging or stalling of the motor were encountered, and extremely stable operation was achieved.

With each of the embodiments of the invention described above, the working power W of the motor is used as a load variation parameter. However it would be equally possible to utilize the motor applied voltage or the motor current as the load variation parameter instead of the working power.

In addition, it would be possible to implement the designated power factor generating circuit 134 as a memory, having stored therein predetermined arbitrary values of power factor, which can be selected by the user as required.

As can be understood from the above, an induction motor control apparatus according to the present invention can be of simple configuration, and so can be manufactured at low cost, and enables energy-saving operation of an induction motor to be achieved over a wide range of load conditions, without the necessity for manual adjustment of a set value of power factor.

What is claimed is:

1. An induction motor control apparatus for controlling a supply of power from an AC power source (10) to an induction motor (12), comprising:
   voltage adjustment means (46) coupled between said AC power source and said induction motor and controllable for varying an amplitude of voltage supplied to said induction motor:
   power factor detection means (16, 18) for obtaining a value of detected power factor (Pfm) at which said induction motor is operating;
   means (28, 30, 32) for producing a load variation parameter (W) corresponding in value to a level of load on said induction motor;
   optimum power factor generating circuit means (36) for converting said load variation parameter to an optimum value of power factor (COMP.Pfs), said optimum power factor generating circuit means producing successively increasing values of said optimum power factor in a range between a minimum limit and a maximum limit, in accordance with successively increasing levels of said motor load between a minimum limit and a maximum limit as indicated by respective values of said load variation parameter;
   comparator means (42) for deriving an amount of difference between said optimum power factor and said detected power factor; and
   means (54) for applying said difference amount to control said voltage adjustment means, to thereby vary the amplitude of said voltage applied to the induction motor such as to reduce said amount of difference.

2. An induction motor control apparatus according to claim 1, in which said power factor detection means comprises:
   means (CT, 22) for periodically obtaining an effective level of AC current (Iu(rms)) flowing in a winding of said induction motor during a fixed number of cycles;
   means (16, 24) for periodically obtaining an effective amplitude of AC voltage (Vuv(rms)) applied to said winding of the induction motor during said fixed number of cycles;
   means (26) for obtaining the product of said effective current and voltage, as a value of apparent power (P);
   means (CT, 146, 28) for obtaining the product of AC current (Iu) and voltage (Vuv) supplied to a winding of said induction motor during at least one cycle, as a value of working power (W); and
   means (35) for dividing said working power by said apparent power to obtain said detected value of power factor (Pfm).

3. An induction motor control apparatus according to claim 2, in which said load variation parameter is said value of working power (W).

4. An induction motor control apparatus according to claim 2, in which said mans for obtaining a value of working power comprises a multiplier (28) for continuously multiplying together a level of voltage applied to a winding of said motor and a level of current flowing in said winding, and averaging circuit means (30, 34) for obtaining, as said value of working power, an average value of an output signal produced from said multiplier.

5. An induction motor control apparatus according to claim 1, in which said voltage adjustment means further comprises rectifier circuit means (104), and DC-to-AC inverter means (108) coupled to receive a DC power supply from said rectifier circuit means and controllable for varying the frequency of said voltage supplied to the induction motor.

6. An induction motor control apparatus according to claim 5, in which said inverter means is supplied with a pulse width modulated control signal having an average value of pulse width that is determined in accordance with said amount of difference (C) between the optimum power factor and detected power factor.

7. An induction motor control apparatus according to claim 1, wherein said optimum power factor generating circuit means comprises:
   power factor designating means (37) for producing an arbitrary designated value of power factor (Pfs);
   function conversion means (38) for converting said load variation parameter in accordance with a predetermined function to obtain a compensation value (COMP); and
   means (39) for operating on said designated value of power factor in conjunction with said compensation value to obtain said optimum value of power factor (COMP.Pfs).

* * * * *